United States Patent
Wood et al.

(10) Patent No.: US 8,403,586 B2
(45) Date of Patent: Mar. 26, 2013

(54) DETERMINANT ASSEMBLY FEATURES FOR VEHICLE STRUCTURES

(75) Inventors: Jeffrey H. Wood, Eureka, MO (US); Michael P. Renieri, St. Peters, MO (US); Thomas R. Berkel, Troy, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/012,602

(22) Filed: Jan. 24, 2011

(65) Prior Publication Data

US 2011/0123254 A1   May 26, 2011

Related U.S. Application Data

(62) Division of application No. 12/350,504, filed on Jan. 8, 2009, now Pat. No. 7,914,223, which is a division of application No. 10/904,802, filed on Nov. 30, 2004, now abandoned.

(51) Int. Cl.
*F16B 9/00* (2006.01)

(52) U.S. Cl. ............ 403/232.1; 403/188; 403/267; 403/382; 403/403

(58) Field of Classification Search .......... 403/188, 403/199, 205, 232.1, 237, 247, 263, 382, 403/403, 267, 268, 269, 270, 364; 248/346.03; 52/293.3, 715, 716.1, 717.03, 718.03, 718.07; 244/131, 132; 24/296
See application file for complete search history.

(56) References Cited

U.S. PATENT DOCUMENTS

| | | | |
|---|---|---|---|
| 178,076 A | 5/1876 | Nostrand | |
| 1,119,248 A | 12/1914 | Daly | |
| 1,652,612 A | 12/1927 | Daniels | |
| RE21,921 E | 10/1941 | Gruelich | |
| 2,276,040 A | 3/1942 | Hull | |
| 2,872,144 A | 2/1959 | Hobson | |
| 3,032,603 A * | 5/1962 | Whitley | 174/94 R |
| 3,263,388 A | 8/1966 | Bogert | |
| 3,334,007 A | 8/1967 | Flagan | |
| 3,355,226 A * | 11/1967 | Portz | 403/268 |
| 3,628,300 A | 12/1971 | Tsurumi | |
| 3,660,887 A * | 5/1972 | Davis | 403/269 |
| 3,877,193 A | 4/1975 | Hall | |
| 3,889,048 A * | 6/1975 | Groth | 174/94 R |
| 3,892,098 A | 7/1975 | Kobori | |
| 3,960,637 A | 6/1976 | Ostrow | |
| 3,977,801 A | 8/1976 | Murphy | |
| 3,989,399 A | 11/1976 | Slowbe | |
| 4,019,298 A | 4/1977 | Johnson, IV | |

(Continued)

FOREIGN PATENT DOCUMENTS

| | | |
|---|---|---|
| DE | 4320164 A1 | 3/1995 |
| GB | 2256023 | 11/1992 |

(Continued)

*Primary Examiner* — Michael P Ferguson
(74) *Attorney, Agent, or Firm* — Yee & Associates, P.C.

(57) ABSTRACT

A determinant assembly feature for a joint assembly and a method of assembly therefor. The joint assembly includes a structure and a web connected thereto. The structure includes a base, a pair of legs extending from the base to define a channel, and one or more location control receiving elements in either leg. The web includes a thickness control element and one or more location control elements correspondingly matched to the location control receiving elements. The method includes providing a structure comprising a base, a pair of legs extending from the base to define a channel and one or more location control receiving elements in either leg; providing a web comprising one or more location control elements and a thickness control element; and inserting the web into the structure, wherein the one or more location control elements is correspondingly matched to the one or more location control receiving elements.

20 Claims, 4 Drawing Sheets

U.S. PATENT DOCUMENTS

| | | | |
|---|---|---|---|
| 4,336,678 A | 6/1982 | Peters | |
| 4,402,118 A * | 9/1983 | Benedetti | 52/718.06 |
| 4,416,099 A | 11/1983 | Fiergolla | |
| 4,645,168 A | 2/1987 | Beard | |
| 4,715,162 A | 12/1987 | Brightwell | |
| 4,823,522 A | 4/1989 | White | |
| 4,958,954 A | 9/1990 | Schmanski | |
| 5,050,820 A | 9/1991 | Anderson | |
| 5,134,812 A | 8/1992 | Hoffman | |
| 5,157,883 A | 10/1992 | Meyer | |
| 5,203,132 A | 4/1993 | Smolik | |
| 5,294,099 A | 3/1994 | Dalfino | |
| 5,419,657 A | 5/1995 | Davis | |
| 5,438,811 A | 8/1995 | Goya | |
| 5,476,704 A | 12/1995 | Kohler | |
| 5,533,307 A | 7/1996 | Tsai | |
| 5,630,298 A | 5/1997 | Tsai | |
| 5,852,908 A | 12/1998 | Nankin | |
| 6,026,623 A | 2/2000 | Anderson | |
| 6,374,570 B1 | 4/2002 | McKague | |
| 6,718,713 B2 | 4/2004 | McKague | |
| 6,745,536 B2 | 6/2004 | Tallman | |
| 6,748,941 B1 | 6/2004 | Ross | |
| 6,749,155 B2 | 6/2004 | Bergmann | |
| 6,754,992 B1 | 6/2004 | Byfield | |
| 6,835,261 B2 | 12/2004 | Schmidt | |
| 6,863,767 B2 | 3/2005 | Bersuch | |
| 6,945,727 B2 | 9/2005 | Christman | |
| 7,037,568 B1 | 5/2006 | Rogers | |
| 7,096,638 B2 * | 8/2006 | Osterland et al. | 52/716.7 |
| 7,555,873 B2 | 7/2009 | Kilwin et al. | |
| 2002/0053175 A1 | 5/2002 | McKague | |
| 2002/0127051 A1 | 9/2002 | Olofsson et al. | |
| 2003/0167707 A1 | 9/2003 | Tsai | |
| 2004/0011927 A1 | 1/2004 | Christman | |
| 2004/0051005 A1 | 3/2004 | Bergmann | |
| 2006/0113450 A1 | 6/2006 | Kilwin | |
| 2006/0113451 A1 | 6/2006 | Kilwin | |
| 2006/0115320 A1 | 6/2006 | Wood et al. | |
| 2009/0123225 A1 | 5/2009 | Wood et al. | |

FOREIGN PATENT DOCUMENTS

| | | |
|---|---|---|
| WO | 95/18013 | 7/1995 |

* cited by examiner

DETERMINANT ASSEMBLY FEATURES FOR VEHICLE STRUCTURES

RELATED APPLICATION

This application is a divisional application of, and claims priority to, U.S. application Ser. No. 12/350,504, filed on Jan. 8, 2009, which is a divisional application of, and claims priority to, U.S. application Ser. No. 10/904,802, filed Nov. 30, 2004, abandoned.

TECHNICAL FIELD

The present disclosure relates generally to a joint assembly and method therefor, and more particularly, to determinant assembly features for a joint assembly.

BACKGROUND DESCRIPTION

Adhesive connected joint assemblies are beginning to be more prevalent as the choice for assembling two structural elements together, whether or not the structure is a static or dynamic structure, such as is a structure used on an airplane. More importantly, the adhesively connected joint assembly provides a way by which structural components are bound together without requiring mechanical fasteners, especially when the material of each component of the joint is either a composite-to-composite or a composite-to-metallic type connection and would otherwise require excessive material waste to fashion a typical flange joint connection out of one of the parts capable of receiving mechanical fasteners. By utilizing the adhesively connected joint to connect structural elements, the weight of the overall structure may be reduced and the structural strength in a particular application may be increased.

One such adhesively connected joint is the pi-joint assembly used for aircraft structures which includes the PI structure, known for its shape resembling the mathematical $\pi$ symbol. The pi-joint assembly includes a web, a pi member and a skin. An adhesive is then typically filled in the gap formed between the web and the pi-member in such a way as to secure the two members. Other pi members may be joined to the other sides of the web in order to complete a given structure, thereby allowing structures like a wing of an airplane to be formed by multiple pi-joint assemblies. Historically, aircraft structures were bent-up sheet metal with crude tolerance control bolted to supporting structures. This necessitated the use of assembly jigs for final location of the mating aircraft structure utilizing shims between the mating parts to accommodate the manufacturing tolerance inaccuracies. The adhesively connected joint or pi-joint is an improvement upon traditional aircraft structures. However, pi-joint has created a disadvantage by necessitating the need to use shims and other assembly jigs for final location and assembly of the joint. The flat panel or web location must be controlled within the pi-member to assure that an adequate adhesive bondline thickness is provided on all sides of the web inside the joint. If the web shifts to one side preventing adhesive from that surface, joint failure can occur. Another disadvantage of such joints is the complicated assembly procedures required in order to properly align the parts prior to applying the adhesive to secure the web to the pi-member.

One known process to assemble the parts is by utilizing holes located in the parts, whereby the parts are located and aligned during assembly. The holes are then drilled to size after the parts are assembled, which necessitates the requirement of subsequently disassembling the parts to remove drill lubricant, chips and other foreign matter introduced between the parts during the drilling process. The cleaned parts are then reassembled and fasteners or jigs are installed along the part to "hold" the parts in alignment with each other while the adhesive is injected into the parts and while it cures. The alignment process may include shims or wires that are positionally located along and between the parts in order to insure a bondline thickness. The minimum bondline thickness is required in order to insure maximum attachment strength between the adhesively joined parts. After the adhesive starts to set or has partially cured, the shims and wires are removed. The voids that are created by removal of the shims and wires are then filled with additional adhesive. The additional steps of locating, drilling, cleaning, reassembly, fastening, shimming, unfastening, unshimming, and filling voids as mentioned above are a disadvantage because time and money are lost due to the additional albeit necessary steps for the present method of assembly. Therefore, there is a need to have an improved method of assembly that reduces or eliminates the current steps. Also, there is a need to have an improved assembly that reduces or eliminates some of the assembly steps, assembly cycle time or assembly costs. Moreover, it would be advantageous to develop parts that reduces the dependency on tooling during the assembly process, reduces variation for part-to-part indexing and improves product repeatability and consistency. Lastly, it would be advantageous to eliminate the need for shims and/or wires to achieve the minimum bond thickness on a pi-joint and it would be advantageous to eliminate or reduce some of the associated assembly steps required by the shimming.

It may be beneficial to use Determinant Assembly (DA) technology in a novel and inventive way to solve or improve the uncertainty of locating and aligning pi-assembly members. It may also be beneficial to use DA technology features in order to provide an improved method of joint assembling. With the advent of close tolerance N/C machines, designers can now create accurately mated net-fit structures that can self locate on the mating parts. Features can be designed and built into the mating parts to assure prescribed locations. This practice is known as Determinant Assembly (DA) since the location of each detail is "determined" by features on the mating details of the assembly. Coupled with the increasing use of fastener-free bonded composite aircraft structural joints, there is an ever-increasing need to take advantage of the DA practice. This will provide increased accuracy of part locations, elimination of assembly jigs, and rapid production rates. Therefore it may be desirable to utilize DA technology, DA concepts and DA features on the parts in order to provide an improved adhesively bonded joint and method of assembling thereof.

SUMMARY

Accordingly, determinant assembly features for a joint assembly and method of assembly thereof is provided that advantageously utilizes DA technology, DA concepts and DA features.

For metallic members the DA features may be precisely machined into each constituent part or parts.

For composite members the DA feature may be precisely machined into each constituent part or parts, or the DA feature may be fabricated or formed into each constituent part or parts. One method that the composite members may be fabricated or formed that comprise the assembled structural joint are typically fabricated using either impregnated composite constituents (prepreg) placed on a shaped one-sided mold and cured in an autoclave or utilize dry composite fabric placed an a one-sided mold with subsequent room temperature infusion of resin in a process known as Vacuum Assisted Resin Transfer Molding (VARTM). Another less common practice is a method in which the composite members may be fabricated or formed is a matched-metal closed mold where the dry fabric is installed into the mold then infused with resin in a process known as Resin Transfer Molding (RTM).

In a first embodiment, determinant assembly features for a joint assembly is provided. The determinant assembly features for a joint assembly of the present disclosure is provided by utilizing DA concepts as mentioned above in creating a novel and inventive joint assembly. The joint assembly includes a structure and a web connected to the structure. The structure includes a base, a pair of axially elongated legs extending from the base to define a channel therebetween, and one or more location control receiving element in either axially elongated leg. The web includes one or more location control element, wherein the location control element of the web is correspondingly matched to the location control receiving element of the structure, whereby an assembly location control is achieved.

Other embodiments of the joint assembly are presented below.

A method of assembling a joint assembly of the present disclosure is also provided. The method of assembling a joint assembly includes providing a structure comprising a base, a pair of axially elongated legs extending from the base to define a channel therebetween, and one or more location control receiving element in either axially elongated leg, providing a web comprising one or more location control element, and inserting the web into the structure, wherein the location control element of the web is correspondingly matched to the location control receiving element of the structure, whereby a determinant assembly is achieved. The method of assembling a joint may also include filling an adhesive between the web and the structure.

Another method of assembling a joint assembly of the present disclosure is also provided below.

Other aspects and advantages will become apparent upon the following detailed description and appended claims, and upon reference to the accompanying drawings.

DETAILED DESCRIPTION OF THE PREFERRED EMBODIMENTS

In the following figures the same reference numerals will be used to identify the same components of a given embodiment.

Figures 1, 5, 6:
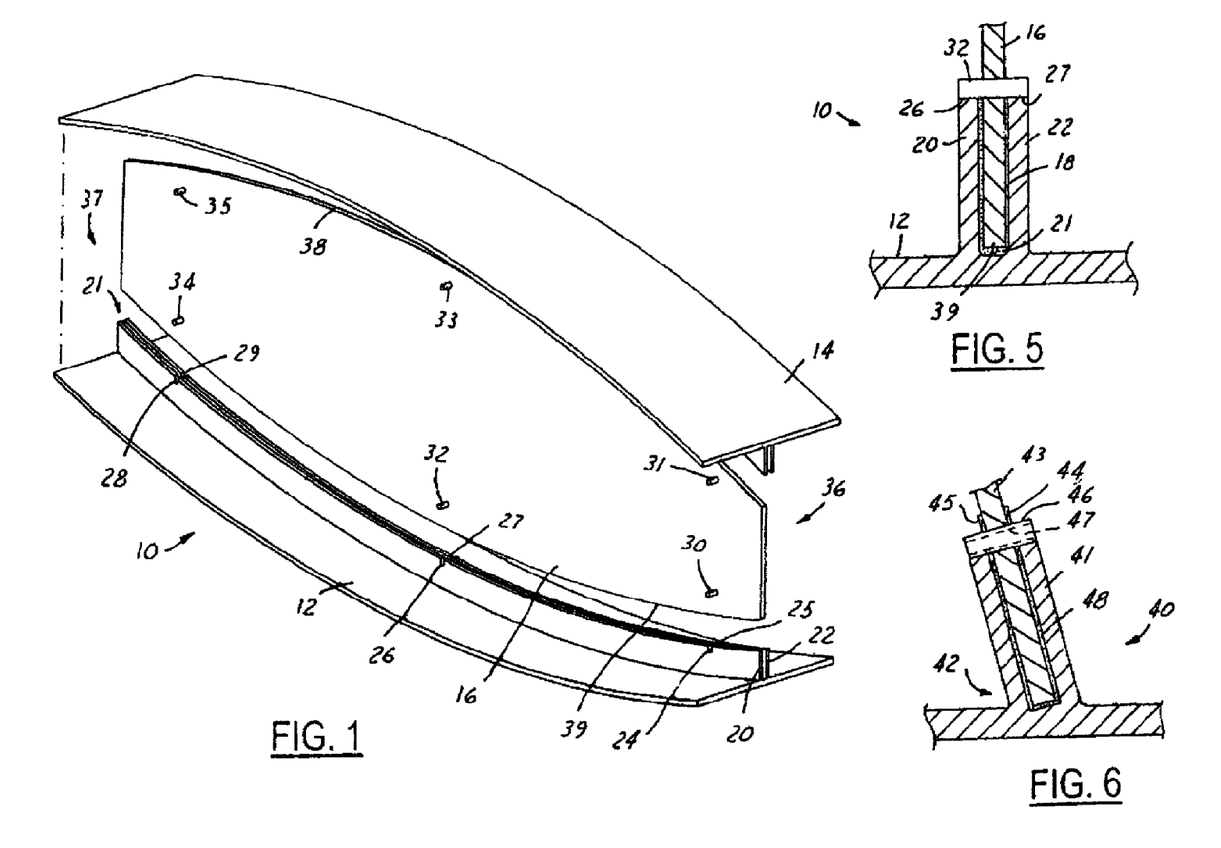
FIG. 1 is an exploded isometric view of a joint assembly for an aircraft in accordance with the present disclosure being used to advantage.
FIG. 5 is a partial cross-sectional view of the joint assembly of FIG. 1.
FIG. 6 is a partial cross-sectional view of the joint assembly in accordance with a fifth embodiment of the present disclosure being used to advantage.

FIG. 1 shows an exploded isometric view of a joint assembly 10 for an aircraft in accordance with the present disclosure being used to advantage. The joint assembly 10 is made from the assembly of a panel or web 16 and a structure 12 coupled to the web 16. This embodiment also shows an additional structure 14 coupled to the web 16. Simultaneous reference may be made to FIG. 5, which shows a partial cross-sectional view of the joint assembly of FIG. 1.

The web 16 may include a front side, a back side, a lower side 39, an upper side 38, a leading side 36 and a trailing side 37. The web 16 also includes six pins or cross pins 30, 31, 32, 33, 34, 35. The cross pins 30, 31, 32, 33, 34, 35 extend through holes in the web 16 and concentrically extend above the front side and the back side. The cross pins 30, 31, 32, 33, 34, 35 of the web 16 each form a location control element or a determinant assembly element in the present embodiment.

The pins 30, 31, 32, 33, 34, 35 of the present embodiment each have a cylindrical peg shape, however a person having skill in the art would recognize that various other shapes may be used and that each pin may have a different shape. The web 16 may have any number of pins or pair of pins, even though six cross pins are presented in the present embodiment.

Alternatively, the pins may form a determinant assembly feature when the pin is formed or machined into the web. The pin when formed or machined into the web may be a nub or a boss.

Each of the location control elements of the web 16 identifies a precise location to which a corresponding part, i.e. the structure 12 or the structure 14 of the present embodiment, may be positionally placed without guess as to either location or alignment thereby achieving linear position control or vertical depth position control in at least one direction. Optionally, it is recognized that as many as one pin may achieve linear position control or vertical depth position control in at least two directions on a single web forming a determinant assembly structure.

The structure 12 of the present embodiment includes a base, a pair of axially elongated legs 20, 22 that extend from the base and define a channel 21 therebetween. The structure 12 further includes the slots 24, 25, 26, 27, 28, 29. The slots 24, 26, 28 are formed or machined in the leg 20 and the slots 25, 27, 29 are formed or machined in the leg 22, thereby forming pairs of slots concentrically aligned in the pair of legs, respectively. The slots 24, 25, 26, 27, 28, 29 of the structure 12 each form a location control receiving element or a determinant assembly feature in the present embodiment.

The slots 24, 25, 26, 27, 28, 29 of the present embodiment each have an open cylindrical channel shape formed to connectively receive the cross pins 30, 32, 34. However, a person having skill in the art would recognize that various other shapes may be used and that each slot may have a different shape consistent with the pin to be connectively received. The structure 12 may have any number of slots or concentric pairs of slots, even though six slots are presented in the present embodiment. Additionally, the slots may be positioned in various locations on each leg of the structure and need not be concentrically located with the slots on the other of the pair of axially elongated legs.

Each of the axially elongated legs 20, 22 include a first channel side, a first rail side, a first leading side, a first trailing side and a first outer side.

Each of the location control receiving elements of the structure 12 identifies a precise location to which a corresponding part, i.e. the web 16 of the present embodiment, may be positionally placed without guess as to either location or alignment thereby achieving linear position control or vertical depth position control in at least one direction, see FIG. 5. Optionally, it is recognized that as many as one slot may achieve linear position control or vertical depth position control in at least two directions on a single web forming a determinant assembly structure.

As depicted in the partial cross-sectional view of FIG. 5, vertical depth position control is achieved where cross pin 32 of the web 16 is concentrically connected to the slots 26, 27 of the structure 12, whereby the assembled relationship between the web 16 and the structure 12 is obtained in at least one direction. The joint assembly 10 further includes an adhesive 18 dispersed through the gap formed by the web 16 and the structure 12 in order to bond the two structures together as required. The adhesive 18 in the present embodiment is an epoxy adhesive. Alternately, the joint may be fixedly attached by fasteners or adhesives as would be recognized by one of skill in the art.

Returning to FIG. 1, the location control elements, i.e., the cross pins 30, 32, 34, of the web 16 are correspondingly matched to the location control receiving elements, i.e., the slots 24, 25, 26, 27, 28, 29, of the structure 12, whereby assembly location control is achieved.

In the present embodiment the joint assembly 10, the lower side 39 of the web 16 is coupled into the channel 21 of the structure 12. Also, a pi structure 14 may be coupled to the upper side 38 of the web 16. However, it is recognized that a single structure being connected as herein described to the web 16 shows the novel aspects including the determinant assembly features of the present disclosure.

Alternately, the location control element may be hollow, whereby the hollow location control element may act as a conduit to pass wires, hydraulic lines, electrical control or supply lines, fluid between sealed bays, fuel transport from bay to bay, or for other suitable applications requiring access from one side of the joint assembly to the other side of the joint assembly.

It is recognized that the web may also be a panel, including flat panel or other recognized structures such as lattices. The web may also be non-porous.

It is recognized that the structure 12 has a pi-shaped cross section, but may also have other cross sections consistent with the present disclosure such as angled cross section, a tilted pi section, an angled pi-shaped cross section, or an offset cross section having a base and two legs forming a channel therebetween.

The web 16 of the present embodiment is finish-machined from a composite material. The structure 12 of the present embodiment is finish-machined from a composite material. The pins 30-35 are made from a composite material.

Alternatively, the structure, the location control element, or the web may each be made from various materials including metallic material, a composite material or other materials compatible with the claims of the present disclosure. Also, the parts of the present disclosure need not be machined, but may be made with other acceptable manufacturing methods for the selected material, wherein the location and orientation of the location control element, location control feature, or location control receiving element are determinately positioned.

The metallic material may be of any composition, but is anticipated to be a high strength aluminum alloy or titanium because of the preferable weight per unit strength relationship. The composite material may be of any composition known to be suitable for joint structures. One composite material composition may be from the carbon fiber fabric infused with resin family. Also a high-modulus carbon fiber fabric infused with toughened epoxy resin may be more suitable for the present embodiment. It is also recognized that the structure, the location control element or the web may each have different materials. Moreover, if the materials are different for each part care may be taken to insure dimensional stability between the parts or care may be taken to select material properties compatible one to another.

Figure 2A:
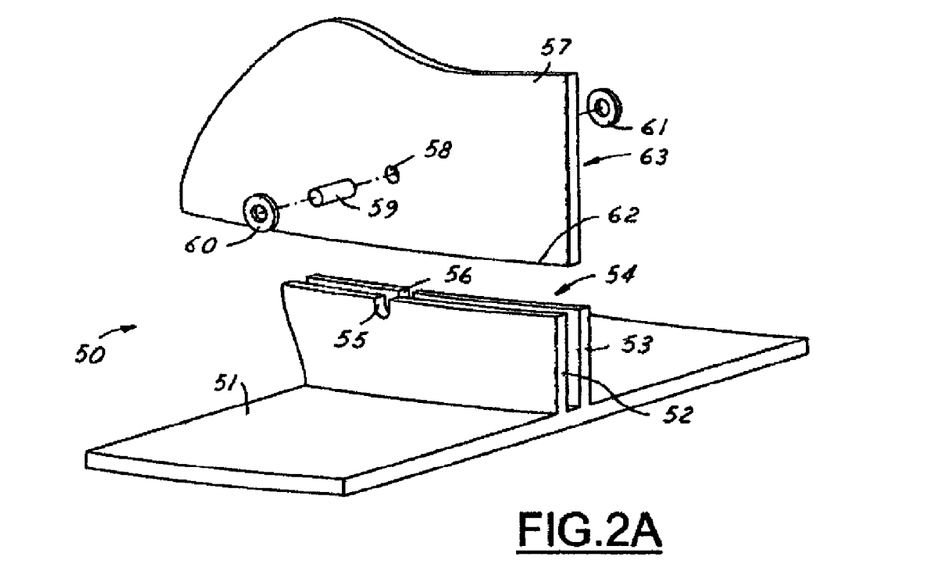
FIG. 2A is a partial exploded view of a joint assembly in accordance with a second embodiment of the present disclosure being used to advantage.
Figure 2B:
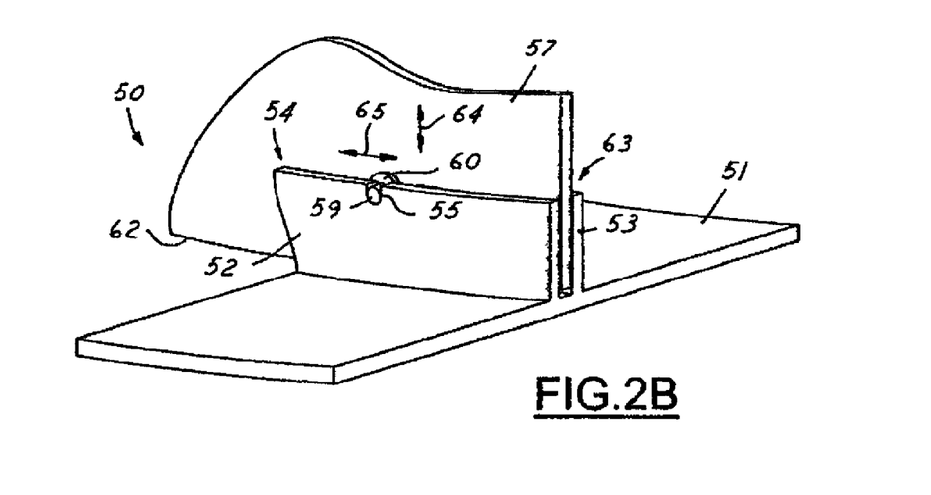
FIG. 2B is an assembled view of the joint assembly of FIG. 2A.

FIG. 2A shows a partial exploded view of a joint assembly 50 in accordance with a second embodiment of the present disclosure being used to advantage. FIG. 2B shows an assembled view of the joint assembly 50 shown in FIG. 2A. The joint assembly 50 is made from the assembly of a panel or web 57, and a structure 51 coupled to the web 57 using determinant assembly methods, elements and features. The joint assembly 50 includes the web 57, the structure 51, a peg 59, and two spacers 60, 61.

The web 57 may include a hole 58, a lower side 62, and a leading side 63. The hole 58 is precisely located within the web 57 for receiving and releasably retaining the peg 59. The peg 59 concentrically extends above the front side and the back side of the web 57. Each spacer 60, 61 is releasably connected to the peg 59 on opposite sides of the web 57, respectively.

The peg 59 forms a location control element or a determinant assembly element in the present embodiment. Optionally, there may be one or more pegs in the web. The peg 59 of the present embodiment has a cylindrical shape, however a person having skill in the art would recognize that various other shapes may be used and that each peg may have a different shape.

The web 57 has a single hole 58 having a sectional shape capable of receiving the peg 59. However, it is recognized that the hole may have other form fitting shapes capable of receiving other peg shapes. Moreover, the web 57 may have one or more holes.

The spacers 60, 61 each form a bondline thickness control element or a thickness control element. Optionally, there may be only one spacer on each peg, may be alternate spacers on each peg or be connected directly to the lower area of the web 57. The spacers 60, 61 of the present embodiment have a hollow cylindrical shape, however a person having skill in the art would recognize that various other shapes may be used and that each spacer may have a different shape.

Alternatively, the pins and or the spacers may form a determinant assembly feature when formed or machined into the web. The pins or the spacers when formed or machined into the web may be a nub, a boss, a resin boss, or a resin rail.

Each of the location control element, i.e. the peg 59, together with the web 57 identifies a precise location to which a corresponding part, i.e. the structure 51 of the present embodiment, may be positionally placed without guess as to either location or alignment thereby achieving linear position control 65 or vertical depth position control 64 in at least one direction. Optionally, it is recognized that as many as one pin may achieve linear position control or vertical depth position control in at least two directions on a single web forming a determinant assembly structure.

Each of the thickness control element, i.e. the spacers 60, 61, together with the web 57 identifies a precise location to which a corresponding part, i.e. the structure 51 of the present embodiment, may be positionally placed without guess as to either location or alignment thereby achieving side to side or gap position control in at least one direction.

The structure 51 of the present embodiment includes a base, a pair of axially elongated legs 52, 53 that extend from the base and define a channel 54 therebetween. The structure 51 further includes the slots 55, 56. The slot 55 is formed or machined in the leg 52 and the slot 56 is formed or machined in the leg 53, thereby forming pairs of slots concentrically aligned in the pair of legs, respectively. The slots 55, 56 of the structure 51 each form a location control receiving element or a determinant assembly feature in the present embodiment.

The slots 55, 56 of the present embodiment each have an open cylindrical channel shape formed to connectively receive the peg 59, however, a person having skill in the art would recognize that various other shapes may be used and that each slot may have a different shape consistent with the peg to be connectively received. The structure 51 may have any number of slots or pair of slots, even though two slots are presented in the present embodiment. Additionally, the slots may be positioned in various locations on each leg of the structure and need not be concentrically located with the slots on the other of the pair of axially elongated legs.

Each of the axially elongated legs 52, 53 includes a first channel side, a first rail side, a first leading side, a first trailing side and a first outer side.

Each of the location control receiving elements of the structure 51 identifies a precise location to which a corresponding part, i.e. the location control element together with the web 57 of the present embodiment, may be positionally placed without guess as to either location or alignment thereby achieving linear position control 65 or vertical depth position control 64 in at least one direction. Optionally, it is recognized that as many as one slot may achieve linear position control or vertical depth position control in at least two directions on a single web forming a determinant assembly structure.

Also, the thickness control elements, i.e. the spacers 60, 61, together with the web 57 identifies a precise location to which a corresponding part, i.e. the structure 51 of the present embodiment, may be positionally placed without guess as to either location or alignment thereby achieving side to side or gap position control in at least one direction within the channel 54 of the structure 51.

The joint assembly 50 may further include an adhesive dispersed through the gap within the channel 54 formed by the web 57 and the structure 51 in order to bond the two structures together.

The web 57 of the present embodiment is finish-machined from a composite material. The structure 51 of the present embodiment is finish-machined from a composite material. The peg 59 and the spacers 60, 61 are made from a composite material.

Alternatively, the structure, the location control element, or the web may each be made from various materials including metallic material, a composite material or other materials compatible with the claims of the present disclosure. Also, the parts of the present disclosure need not be machined, but may be made with other acceptable manufacturing methods for the selected material, wherein the location and orientation of the location control element, location control feature, or location control receiving element are determinately positioned.

Figure 3A:
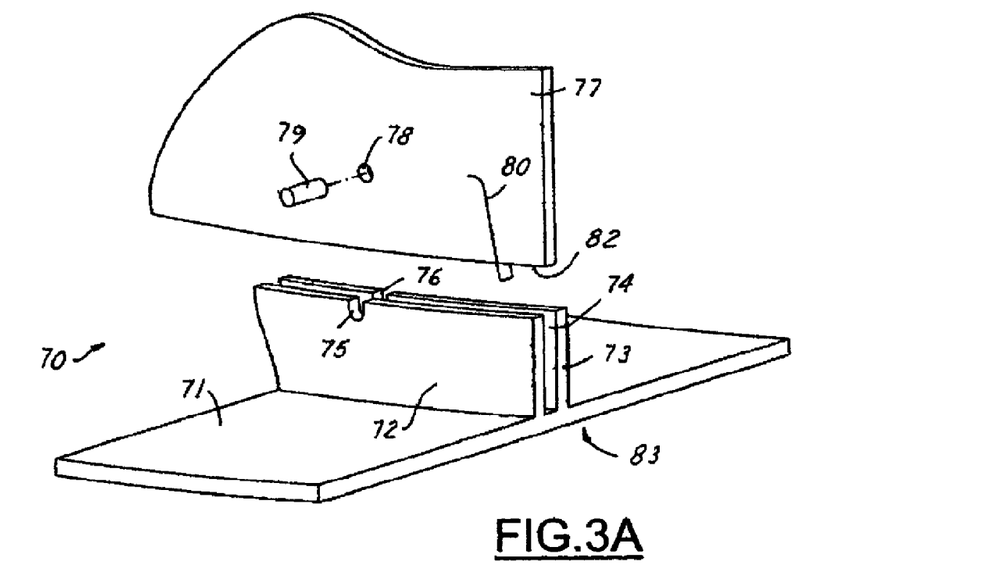
FIG. 3A is a partial exploded view of a joint assembly in accordance with a third embodiment of the present disclosure being used to advantage.
Figure 3B:
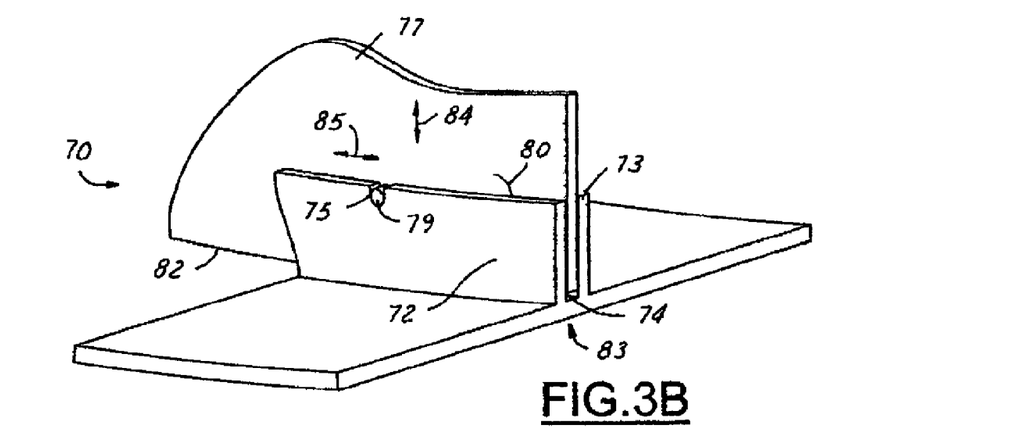
FIG. 3B is an assembled view of the joint assembly of FIG. 3A.

FIG. 3A shows a partial exploded view of a joint assembly 70 in accordance with a third embodiment of the present disclosure being used to advantage. FIG. 3B shows an assembled view of the joint assembly 70 shown in FIG. 3A. The joint assembly 70 is made from the assembly of a panel or web 77, and a structure 71 coupled to the web 77 using determinant assembly methods, elements and features. The joint assembly 70 includes the web 77, the structure 71, a peg 79, and a thickness control element or wire 80.

The web 77 includes a hole 78, a lower side 82, and a leading side 83. The hole 78 is precisely located within the web 77 for receiving and removeably retaining the peg 79. The peg 79 extends above the front side and the back side of the web 79. Alternatively the peg 79 may extend above a single side of the web 79. The wire 80 is releasably connected to the web 77 from the front side around the lower side 82 to the back side.

The peg 79 forms a location control element or a determinant assembly element in the present embodiment.

The wire 80 forms a bondline thickness control element or a thickness control element. Optionally, there may be more than one wire connected directly to the lower area of the web 77. The wire 80 of the present embodiment has a flattened U shape, however, a person having skill in the art would recognize that various other shapes may be used and that each spacer may have a different shape in order to provide thickness control for applying adhesive. It is recognized that the wire 80 may be made from metal, however the wire may also be made from a compatible material with that of the other parts such as an epoxy filament.

Each of the location control element, i.e. the peg 79, together with the web 77 identifies a precise location to which a corresponding part, i.e. the structure 71 of the present embodiment, may be positionally placed without guess as to either location or alignment thereby achieving linear position control 85 or vertical depth position control 84 in at least one direction. Optionally, it is recognized that as many as one pin may achieve linear position control or vertical depth position control in at least two directions on a single web forming a determinant assembly structure.

Each of the thickness control element, i.e. the wire 80, together with the web 77 identifies a precise location to which a corresponding part, i.e. the structure 71 of the present embodiment, may be positionally placed without guess as to either location or alignment thereby achieving side to side or gap position control in at least one direction when the web 77 is placed into the channel of the structure 71.

The structure 71 of the present embodiment includes a base, a pair of axially elongated legs 72, 73 that extend from the base and define a channel 74 therebetween. The structure 71 further includes the slots 75, 76. The slot 75 is formed or machined in the leg 72 and the slot 76 is formed or machined in the leg 73, thereby forming pairs of slots concentrically aligned in the pair of legs, respectively. The slots 75, 76 of the structure 71 each form a location control receiving element or a determinant assembly feature in the present embodiment.

The slots 75, 76 of the present embodiment each have an open cylindrical channel shape formed to connectively receive the peg 79, however, a person having skill in the art would recognize that various other shapes may be used and that each slot may have a different shape consistent with the peg to be connectively received. The structure 71 may have any number of slots or pair of slots, even though two slots are presented in the present embodiment. Additionally, the slots may be positioned in various locations on each leg of the structure and need not be concentrically located with the slots on the other of the pair of axially elongated legs.

Each of the axially elongated legs 72, 73 include a first channel side, a first rail side, a first leading side, a first trailing side and a first outer side.

Each of the location control receiving elements of the structure 71 identifies a precise location to which a corresponding part, i.e. the location control element together with the web 77 of the present embodiment, may be positionally placed without guess as to either location or alignment thereby achieving linear position control 85 or vertical depth position control 84 in at least one direction.

Also, the thickness control element, i.e. wire 80, together with the web 77 identifies a precise location to which a corresponding part, i.e. the structure 71 of the present embodiment, may be positionally placed without guess as to either location or alignment thereby achieving side to side or gap position control in at least one direction within the channel 74 of the structure 71.

The joint assembly 70 may further include an adhesive dispersed through the gap within the channel 74 formed by the web 77 inserted into the structure 71 in order to bond the two structures together. Moreover, the thickness control element may provide a minimum distance in which the adhesive may bond the two structures. The minimum distance may be 0.02 inches thick.

Figure 4A:
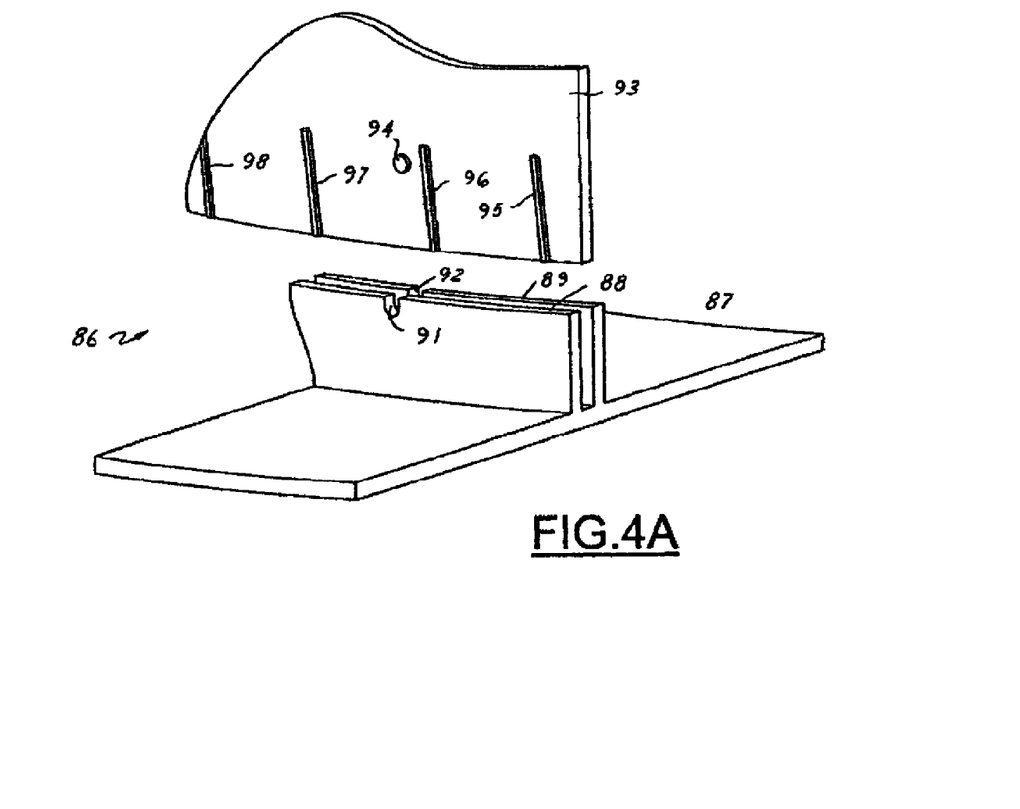
FIG. 4A is a partial exploded view of a joint assembly in accordance with a fourth embodiment of the present disclosure being used to advantage.
Figure 4B:
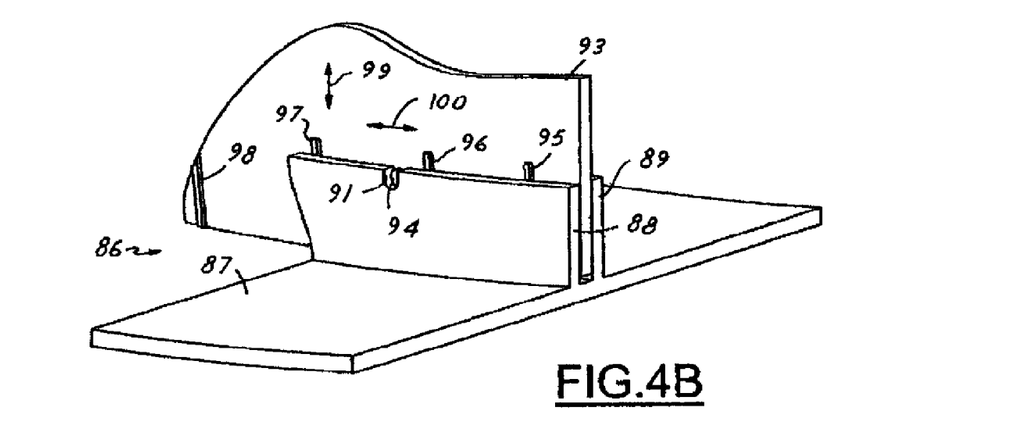
FIG. 4B is an assembled view of the joint assembly of FIG. 4A.

FIG. 4A shows a partial exploded view of a joint assembly 86 in accordance with a fourth embodiment of the present disclosure being used to advantage. FIG. 4B shows an assembled view of the joint assembly 86 shown in FIG. 4A. The joint assembly 86 is made from the assembly of a panel or web 93, and a structure 87 coupled to the web 93 using determinant assembly methods, elements or features. The joint assembly 86 includes the web 93 and the structure 87.

The web 93 includes a nub or boss 94 and the rails 95, 96, 97, 98. The boss 94 is precisely located on the web 93. The rails 95, 96, 97, 98 are positionally spaced and located in the lower area of the web 93. The boss 94 extends above the front side of the web 57.

The boss 94 forms a location control element or a determinant assembly feature upon the web 93 in the present embodiment. Optionally, there may be one or more boss formed on the web. The boss 94 of the present embodiment has a cylindrical shape extending from the side of the web 93, however a person having skill in the art would recognize that various other shapes may be used and that each boss may have a different shape. Also, each of the one or more boss may extend from any side of the web 93.

The rails 95, 96, 97, 98 each form a bondline thickness control element or a thickness control feature. Optionally, there may be a single rail formed directly in the lower area of the web 93. It is recognized that each rail may be formed on the front side, lower side or back side of the web 93. The rails 95, 96, 97, 98 of the present embodiment have a pencil shape, however, a person having skill in the art would recognize that various other shapes may be used and that each spacer may have a different shape. Moreover the rails may have a shape that is similar to the boss, but having a lower profile conducive to thickness control.

Optionally, the boss 94 or the rails 95, 96, 97, 98 when formed or machined into the web 93 may be a nub, a boss, a rail, a resin nub, a resin boss, or a resin rail.

Each of the location control element, i.e. the boss 94, on the web 93 identifies a precise location to which a corresponding part, i.e. the structure 87 of the present embodiment, may be positionally placed without guess as to either location or alignment thereby achieving linear position control 100 or vertical depth position control 99 in at least one direction. Optionally, it is recognized that as many as one boss may achieve linear position control or vertical depth position control in at least two directions on a single web forming a determinant assembly structure.

Each of the thickness control element, i.e. rails 95, 96, 97, 98, on the web 57 identifies a thickness location to which a corresponding part, i.e. the structure 51 of the present embodiment, may be positionally placed without guess as to either location or alignment thereby achieving side to side or gap position control in at least one direction.

The structure 87 of the present embodiment includes a base, a pair of axially elongated legs 88, 89 that extend from the base and define a channel 90 therebetween. The structure 87 further includes the slots 91, 92. The slot 91 is formed or machined in the leg 88, thereby forming a receivable slot. The slots 91, 92 of the structure 87 each form a location control receiving element, a determinant assembly element or a determinant assembly feature in the present embodiment.

The slots 91, 92 of the present embodiment each have an open cylindrical channel shape formed to connectively receive the boss 94, however, a person having skill in the art would recognize that various other shapes may be used and that each slot may have a different shape consistent with the boss to be connectively received. The structure 87 may have any number of slots or pair of slots, even though two independent slots are presented in the present embodiment. Additionally, the slots may be positioned in various locations on each leg of the structure and need not be concentrically located with the slots on the other of the pair of axially elongated legs.

Each of the axially elongated legs 88, 89 include a first channel side, a first rail side, a first leading side, a first trailing side and a first outer side.

Each of the location control receiving elements of the structure 87 identifies a precise location to which a corresponding part, i.e. the location control feature of the web 93 of the present embodiment, may be positionally placed without guess as to either location or alignment thereby achieving linear position control 100 or vertical depth position control 99 in at least one direction. Optionally, it is recognized that as many as one boss may achieve linear position control or vertical depth position control in at least two directions on a single web forming a determinant assembly structure.

Also, the thickness control elements, i.e. the rails 95, 96, 97, 98 on the web 93 identifies a gap location to which a corresponding part, i.e. the structure 87 of the present embodiment, may be positionally placed without guess as to either location or alignment thereby achieving side to side or gap position control in at least one direction within the channel 90 of the structure 87.

The joint assembly 86 may further include an adhesive dispersed through the gap within the channel 90 formed by the web 93 and the structure 87 in order to bond the two structures together.

The web 93 of the present embodiment may be finish-machined from a composite material. The structure 87 of the present embodiment is finish-machined from a composite material. Optionally, the web 93 or the structure 87 may be precision molded from carbon impregnated fabric with diffused epoxy resin in precision form from a mold having DA features precisely formed within the mold.

FIG. 6 is a partial cross-sectional view of the joint assembly 40 in accordance with a fifth embodiment of the present disclosure being used to advantage. The present embodiment is consistent with the features presented in the other embodiments. Accordingly, optional features are presented.

The peg 46 is hollow having interior wall 47, whereby the peg 46 may act as a conduit.

The structure 40 may include a tilt 42. In the present embodiment, the tilt 42 forms an angled pi-structure.

A method of assembling a joint assembly of the present disclosure is also provided. The method of assembling a joint assembly includes providing a structure comprising a base, a pair of axially elongated legs extending from the base to define a channel therebetween, and one or more location control receiving element in either axially elongated leg, providing a web comprising one or more location control element, and inserting the web into the structure, wherein the location control element of the web is correspondingly matched to the location control receiving element of the structure, whereby a determinant assembly is achieved. The method of assembling a joint may also include filling an adhesive between the web and the structure.

When inserting the web to the structure, location control element of the web is connected to the location control receiving element of the structure.

An additional method of assembling a joint assembly of the present disclosure is also provided. The method of assembling a joint assembly includes providing a web, providing at least one determinant assembly element; providing at least one thickness control element, providing a structure having a base, a pair of axially elongated legs extending from the base to define a channel therebetween, and at least one determinant assembly feature in either axially elongated leg, coupling the determinant assembly element to the web, coupling the thickness control element to the web or the determinant assembly element, and inserting the web, the determinant assembly and the thickness control element into the structure, wherein the web with the determinant assembly element is determinately coupled to the structure, and the thickness control element determinately spacing the web between the pair of axially elongated legs of the structure. The method of assembling a joint may also include waiting for a cure time after filling the adhesive. Also, the method of assembling a joint assembly may also include filling an adhesive into a void formed by removing the determinant assembly element or the thickness control element.

For metallic members the DA features may be precisely machined into each constituent part or parts.

For composite members the DA features may be precisely machined into each constituent part or parts, or the DA features may be fabricated or formed within the mold that is used to make each constituent part or parts. A method by which a composite members may be fabricated or formed is by using either impregnated composite constituents (prepreg) placed on a shaped one-sided mold and cured in an autoclave or utilize dry composite fabric placed an a one-sided mold with subsequent room temperature infusion of resin in a process known as Vacuum Assisted Resin Transfer Molding (VARTM). Another method that the composite members may be fabricated or formed is by using a matched-metal closed mold where the dry fabric is installed into the mold then infused with resin in a process known as Resin Transfer Molding (RTM).

The VARTM and autoclaved components are trimmed to net size due to excess material and rough edges created by these manufacturing processes. During the machining process for trimming, features may be machined in by the accurate N/C machining center that may act as location features in the assembly process.

Since RTM parts are fabricated net shape and do not require a trimming process, features may be machined into the matched-metal mold that, after infusion of resin into the mold, create resin bosses or rails for DA features to facilitate the assembly process.

The flat panel web of the assembly may be drilled to receive a cross pin at a location specific from the panel edge. The PI component of the assembly may be machined with a slot in the ends of the PI legs at a depth specific from the bottom of the PI flange. The slot may receive the cross pin that was installed in the flat panel and position the panel in the desired depth location within the PI legs. The cross pins can either be bonded in place for permanent installation or removed after the adhesive is cured.

For an RTM part, a shallow round hole may be machined into the matched-metal mold at locations matching those of the slots in the mating PI structure. These holes will fill with resin during the infusion process and provide a resin rich pin-type locator.

The side-to-side location may be achieved by either a polymer string (fishing line) of a prescribed diameter draped down inside the channel of the PI legs or by using a shim spacer on either side of the panel when installed within the PI structure. The shim spacer material may be compatible with the composite and adhesive system.

For an RTM part, the matched-metal mold may have pockets or voids machined in appropriate locations that will fill with resin during the infusion process forming rails or bosses. The height of each rail will equal the adhesive thickness requirements to assure that adhesive is introduced into the joint on all sides of the flat panel within the joint assembly.

While the joint assembly of the present disclosure has been described in connection with one or more embodiments, it should be understood that it is not limited to those embodiments. On the contrary, the disclosure is intended to cover all alternatives, modifications, and equivalents, as may be included within the spirit and scope of the appended claims.

What is claimed is:

1. A joint assembly comprising:
a base having an axis, the base comprising: first and second parallel axially elongated legs, both axially elongated legs respectively extending from the base and spaced apart to define a channel therebetween, the channel comprising a channel depth and a channel width, the first and the second axially elongated legs each comprising: a channel side, an opposing outer side, and a rail edge, the rail edge being opposite the base and at least one of the first and second legs comprising a slot configured to receive a location control element;
a web comprising a planar panel comprising: opposing planar front and back sides, a lower edge, opposing leading and trailing edges, and a location control element comprising one of a pin, spacer, nub or boss protruding from at least one of the front and back sides, such that the lower edge comprises a thickness from the front side to the back side that is narrower than the channel width;
a bondline thickness control element comprising a wire connected to the front and back sides of the panel and wrapping around the lower edge of the panel, and exposed beyond the rail edge of the first and the second axially elongated legs, when the lower edge of the panel is situated within the channel, and wherein the location control element is received in the slot, such that the wire contacts the channel side of each of the first and the second axially elongated legs, and a thickness of the wire establishes a spacing between each of the front and back sides of the panel and the channel side of the first and second axially elongated legs, respectively, and a spacing between the lower edge of the web and the base; and an adhesive occupying the spacing and bonding the web to the first and second axially elongated legs.

2. The joint assembly according to claim 1, such that each axially elongated leg is positioned substantially perpendicular to the base.

3. The joint assembly according to claim 1, such that each axially elongated leg is positioned at an angle less than 90 degrees relative to the base.

4. The joint assembly according to claim 1, such that the wire conforms to a shape of the web.

5. The joint assembly according to claim 1, such that the bondline thickness control element comprises a plurality of spaced apart wires connected to the lower edge of the web.

6. The joint assembly of claim 5, such that the plurality of spaced apart wires are releasably connected to the planar surface.

7. The joint assembly of claim 6, such that a shape of each wire in the plurality of wires is variable from a shape of any other wire in the plurality of wires.

8. The joint assembly according to claim 1, such that the spacing between the front side of the panel and the channel side of the first axially elongated leg, and between the back side of the panel and the channel side of the second axially elongated leg, respectively, are both at least 0.02 inches.

9. The joint assembly of claim 1, such that the bondline thickness control element comprises an epoxy filament.

10. The joint assembly of claim 1, such that the location control element comprises a pin extending from an opening in at least one of the front and back sides of the web.

11. The joint assembly of claim 10, wherein the pin is a hollow conduit.

12. The joint assembly of claim 1, such that the wire is releasably connected to the panel.

13. A joint assembly comprising:
a base;
a pair of first and second parallel axially elongated legs, both axially elongated legs respectively extending from the base and spaced apart to define a channel therebetween, the first and the second axially elongated legs each comprising: a channel side, and a rail edge, the rail edge being opposite the base and at least one of the first and second legs comprising a slot configured to receive a location control element;
a web comprising a planar panel comprising: opposing planar front and back sides, a lower edge, and a location control element comprising one of a pin, spacer, nub or boss protruding from at least one of the front and back sides;
a wire connected to the front and back sides of the web and wrapping around the lower edge of the panel, such that when the lower edge of the panel is situated within the channel and wherein the location control element is received in the slot, the wire extends exposed beyond the rail edge of the first and the second axially elongated legs, and the wire contacts the channel side of each of the first and the second axially elongated legs, and a thickness of the wire establishes a spacing between each of the front and back sides of the panel and the channel side of the first and second axially elongated legs, respectively, and a spacing between the lower edge of the web and the base; and
an adhesive occupying the spacing and bonding the web to the first and second axially elongated legs.

14. A method of assembling a joint assembly comprising:
using a structure comprising: a base, and first and second parallel axially elongated legs, both axially elongated legs respectively extending from the base and spaced apart to define a channel therebetween, the first and the second axially elongated legs each comprising: a channel side, and a rail edge, the rail edge being opposite the base and at least one of the first and second legs comprising a slot configured to receive a location control element;
using a web comprising a planar panel comprising: opposing planar front and back sides, a lower edge, and a location control element comprising one of a pin, spacer, nub or boss protruding from at least one of the front and back sides;
connecting a bondline thickness control element to the web, the bondline thickness control element comprising a wire connected to the front and back sides of the web and wrapping around the lower edge of the panel;
positioning the lower edge of the panel within the channel such that the location control element is received in the slot, and such that the wire extends exposed beyond the rail edge of the first and the second axially elongated legs, and the wire contacts the channel side of each of the first and the second axially elongated legs, and a thickness of the wire establishes a spacing between each of the front and back sides of the panel and the channel side of the first and second axially elongated legs, respectively, and a spacing between the lower edge of the web and the base; and
bonding the web to the first and second axially elongated legs with an adhesive occupying the spacing.

15. The method according to claim 14, such that each axially elongated leg is positioned substantially perpendicular to the base.

16. The method according to claim 14, such that each axially elongated leg is positioned at an angle less than 90 degrees relative to the base.

17. The method according to claim 14, wherein the wire conforms to a shape of the web.

18. The method according to claim 14, such that the bondline thickness control element comprises a plurality of spaced apart wires connected to the lower edge of the web.

19. The method of claim 14, wherein the wire comprises an epoxy filament.

20. The method of claim 14, such that the wire is releasably connected to the panel.

* * * * *